(12) United States Patent
Tsukuda et al.

(10) Patent No.: US 6,312,847 B1
(45) Date of Patent: Nov. 6, 2001

(54) BASE TUBE FOR FUEL CELL

(75) Inventors: Hiroshi Tsukuda; Akihiro Yamashita; Kenichiro Kosaka; Nagao Hisatome; Toru Houjyou, all of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/258,568

(22) Filed: Feb. 26, 1999

(30) Foreign Application Priority Data

Jul. 27, 1998 (JP) .................................................. 10-210581

(51) Int. Cl.$^7$ ...................................................... H01M 8/12
(52) U.S. Cl. .................................................. 429/31; 429/30
(58) Field of Search ........................................ 429/30–33

(56) References Cited

U.S. PATENT DOCUMENTS

| | | | |
|---|---|---|---|
| 4,598,028 | * 7/1986 | Rossing | 429/30 |
| 5,073,405 | * 12/1991 | Vasilow | 427/105 |
| 5,108,850 | * 4/1992 | Carlson | 429/31 |
| 5,244,742 | * 9/1993 | Zymboly | 429/31 |
| 5,426,003 | * 6/1995 | Spengler | 429/27 |
| 5,543,239 | * 8/1996 | Virkar | 429/33 |
| 5,591,537 | * 1/1997 | Bagger | 429/33 |
| 5,686,198 | * 11/1997 | Kuo | 429/30 |

* cited by examiner

Primary Examiner—Gabrielle Brouillette
Assistant Examiner—Mark Ruthkosky
(74) Attorney, Agent, or Firm—Anderson, Kill & Olick, P.C.

(57) ABSTRACT

The present invention discloses a base tube for a fuel cell produced by forming a film of a fuel electrode and a film of an air electrode on a surface of the base tube, the base tube comprising a mixture of a raw material for the base tube, and coarse particles of metal oxide, whereby the mixture shrinks nonuniformly when sintered to increase the porosity of the base tube. Thus, the gas permeability and the cell electrical efficiency can be increased.

2 Claims, 1 Drawing Sheet

BASE TUBE FOR FUEL CELL

BACKGROUND OF THE INVENTION

1. Field of the Invention

This invention relates to a base tube for a fuel cell, whose porosity and pore diameter are increased to improve the power generation characteristics of the resulting fuel cell.

2. Description of the Related Art

FIG. 1 shows the outline of a base tube of a thermal spray type solid electrolyte fuel cell.

A thermal spray type solid electrolyte fuel cell (SOFC), as shown in FIG. 1, is produced in the following manner: A thermit of Ni and yttria-stabilized zirconia (YSZ) is provided in a film form by plasma spraying on a porous cylindrical base tube 1 of calcia-stabilized zirconia (CSZ) to serve as a fuel electrode 2. On this fuel electrode 2, oxygen ion-conductive YSZ is provided in a film form by plasma spraying to serve as an electrolyte 3. On this electrolyte 3, $LaCoO_3$ is provided in a film form by acetylene flame spraying to serve as an air electrode 4. In this manner, a fuel cell is constructed. Finally, the fuel electrode 2 and the air electrode 4 are connected together in series by an electrically conductive connecting material (interconnector) 5 in a film form composed of a thermit of NiAl and alumina.

The production of a fuel cell by thermal spraying as earlier technology is laborious and costly, and should be decreased in cost. Thus, a co-sinter type fuel cell, which is composed of a base tube, a fuel electrode and an electrolyte sintered integrally, and requires a reduced number of sintering operations, has been developed. However, this type of fuel cell poses the problem of insufficient gas permeability of the base tube for achieving desired power generation characteristics. Under these circumstances, the present invention proposes a base tube for an integral sinter type fuel cell, the base tube having increased porosity and pore diameter to improve the power generation characteristics of the fuel cell.

SUMMARY OF THE INVENTION

The present invention provides a base tube for a fuel cell produced by forming a film of a fuel electrode and a film of an air electrode on a surface of the base tube, the base tube comprising a mixture of a raw material for the base tube, and either coarse particles of the same material as the raw material for the base tube, or a metal oxide, whereby the mixture shrinks nonuniformly when sintered to increase the porosity of the base tube.

The mean particle diameter of the raw material for the base tube maybe 1 $\mu$m, and the mixture may consist of the raw material for the base tube, and the coarse particles having a particle diameter of 5 $\mu$m or more.

The mixture may contain 10 to 40% by weight of the coarse particles.

The raw material for the base tube may be calcia-stabilized zirconia (CSZ).

The raw material for the base tube may be fine particles of calcia-stabilized zirconia (CSZ), and the mixture may consist of the raw material for the base tube, and fine particles of the metal oxide selected from the group consisting of NiO, CoO and FeO, the fine particles of the metal oxide having the same particle diameter as the particle diameter of the raw material for the base tube, whereby the mixture shrinks nonuniformly when sintered to increase the porosity of the base tube.

The mixture may contain 10 to 40% by weight of the fine particles of the metal oxide.

The raw material for the base tube may be calcia-stabilized zirconia (CSZ) having a particle diameter of 1 $\mu$m, and the mixture may consist of the raw material for the base tube, and coarse particles of the metal oxide selected from the group consisting of NiO, CoO and FeO, the coarse particles of the metal oxide having a particle diameter of 5 $\mu$m or more, whereby the mixture shrinks nonuniformly when sintered to increase the porosity of the base tube.

The mixture may contain 10 to 40% by weight of the coarse particles of the metal oxide.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED DESCRIPTION OF THE PREFERRED EMBODIMENTS

Figure 1:
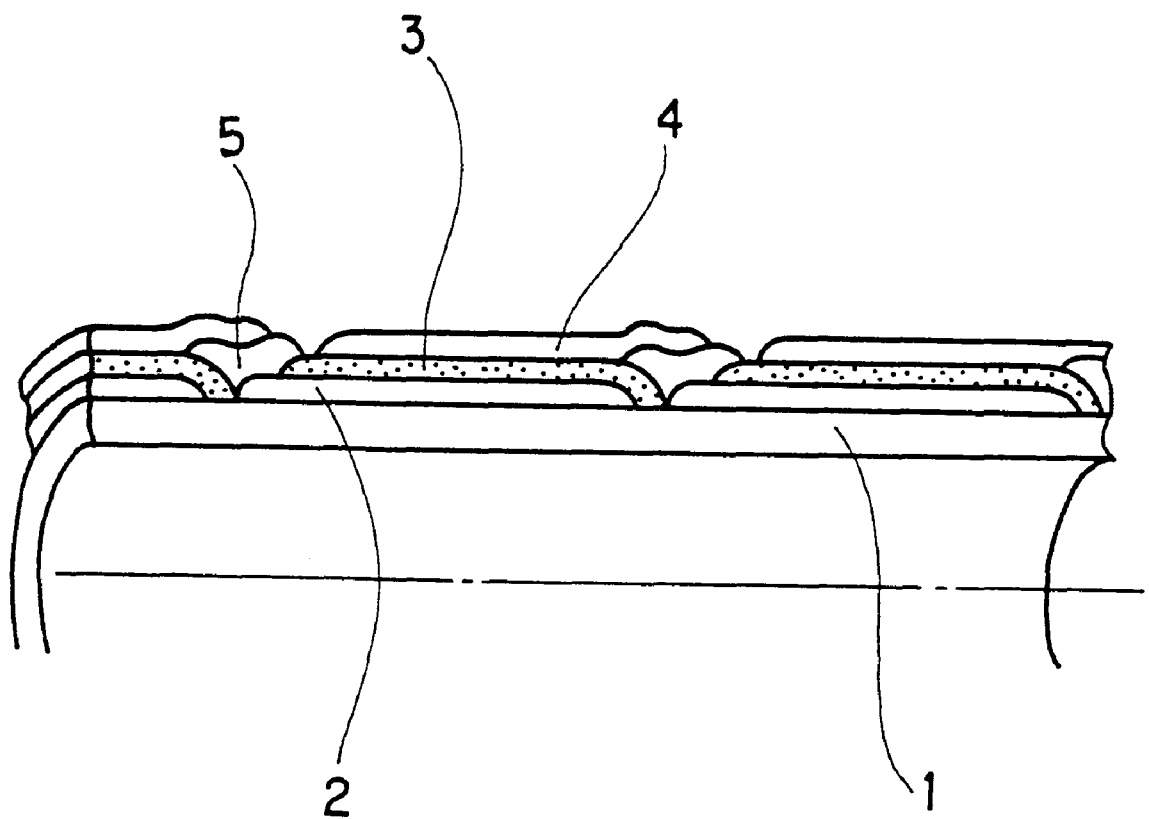
FIG. 1 is a schematic view of a base tube for a thermal spray type solid electrolyte fuel cell.

Preferred embodiments of the present invention will now be described, but it should be understood that the invention is not restricted thereby.

(1) The base tube of the invention comprises a mixture of a raw material for the base tube, and coarse particles, so that the mixture shrinks nonuniformly during sintering to increase the porosity of the resulting base tube. The invention, which makes shrinkage nonuniform during sintering to increase the porosity, improves gas permeability. Not only the porosity, but also the mean pore diameter can be increased, so that gas permeability can be further improved.

The raw material in the invention is fine particles of calcia-stabilized zirconia (CSZ) having a mean particle diameter of 1 $\mu$m. The coarse particles mixed with the fine particles may be calcia-stabilized zirconia (CSZ) having a mean particle diameter of 5 $\mu$m or more, preferably about 10 $\mu$m.

The raw material is not restricted, and $MgO$—$MgAl_2O_4$, $CaTiO_3$—$MgAl_2O_4$, $MgTiO_3$—$MgAl_2O_4$, and $BaTiO_3$—$MgAl_2O_4$ can be exemplified instead of the calcia-stabilized zirconia (CSZ).

The upper limit of the particle diameter of the coarse particles added is, but not limited to, about 200 to 300 $\mu$m.

The content of the coarse particles is not restricted, but preferably 10 to 40% by weight. If it is less than 10% by weight, the increase in the porosity will be small. If it is more than 40% by weight, a further increase in the porosity will not be achieved.

The sintering temperature in the invention is preferably 1,300 to 1,500° C. If it is lower than 1,300° C., the electrolyte and the interconnector will be insufficient in compaction. With sintering at a temperature above 1,500° C., compaction of the fuel electrode will be accelerated, producing unfavorable results.

(2) Alternatively, the base tube of the invention comprises a mixture of the raw material for the base tube, and a metal oxide. Because of the addition of the metal oxide, the base tube shrinks reductively during power generation, thereby generating pores anew, increasing the pore diameters, and eventually improving the gas permeability. Since the porosity can be increased, and the mean pore diameter also increased, the gas permeability can be improved.

The metal oxide added is fine particles selected from the group consisting of NiO, CoO and FeO. Because of its addition, shrinkage of the mixture can be made nonuniform at the time of sintering to increase the porosity.

The particle diameter of the metal oxide may be 5 $\mu$m or more, preferably about 20 $\mu$m, rather than the same particle diameter as the particle diameter of the raw material. In this case, increases in the porosity and the pore diameter can be realized, owing to synergy between a shrinkage effect due to reduction of the added metal oxide during power generation and a shrinkage effect due to the increased particle diameter of the added metal oxide during sintering.

The content of the metal oxide is not restricted, but preferably 10 to 40% by weight. If it is less than 10% by weight, the increase in the porosity will be small. If it is more than 40% by weight, a further increase in the porosity will not be achieved.

The present invention will be described in more detail with reference to Examples, which in no way limit the invention.

EXAMPLE 1

80% by weight of a CSZ raw material with a mean particle diameter of 1 µm, and 20% by weight of coarse CSZ particles with a particle diameter of 10 µm were mixed, and sintered at 1,350° C.

EXAMPLE 2

80% by weight of a CSZ raw material with a mean particle diameter of 1 µm, and 20% by weight of an NiO material with a particle diameter of 1 µm were mixed, and sintered at 1,350° C.

EXAMPLE 3

80% by weight of a CSZ raw material with a mean particle diameter of 1 µm, and 20% by weight of an NiO material with a particle diameter of 20 µm were mixed, and sintered at 1,350° C.

Comparative Example 1

As a control, a CSZ raw material with a mean particle diameter of 1 µm was used alone, and sintered in the same way.

The porosity, pore diameter, and cell electrical efficiency of each of the resulting sinters are shown in Table 1.

TABLE 1

| | CSZ raw material | NiO material | Porosity | Pore diameter | Cell electrical efficiency* |
|---|---|---|---|---|---|
| Comp. Ex. 1 | Particle diameter 1 µm: 100% | None | 15% | 0.7 µm | 0.12 |
| Ex. 1 | Particle diameter 1 µm: 80% Particle diameter 10 µm: 20% | None | 20% | 0.7 µm | 0.31 |
| Ex. 2 | Particle diameter 1 µm: 80% | Particle diameter 1 µm: 20% | 25% | 0.7 µm | 0.37 |
| Ex. 3 | Particle diameter 1 µm: 80% | Particle diameter 10 µm: 20% | 30% | 1.2 µm | 0.44 |

*Ratio of power output from a cell to fuel input

As shown in Table 1, the base tubes of the present invention were all increased in the porosity and improved in the cell electrical efficiency in comparison with the control. Furthermore, as shown in Example 3, the addition of the metal material and the associated further increase in the particle diameter synergistically resulted in a further improvement in the cell electrical efficiency.

That is, the porosity in the control was about 15%. In the present invention, on the other hand, the porosity was increased to 20%, so that the increase in the cell electrical efficiency was achieved.

Besides, the metal oxide having the same particle diameter as that of the raw material was added instead of the coarse particles of the same material as the raw material. In this case, the porosity was increased to 25% as contrasted with 15% in the earlier technology. Thus, the increase in the cell electrical efficiency was achieved.

When the metal oxide having a larger particle diameter than in the preceding case was added, moreover, the porosity was 30%, a further increase over the porosity of 15% in the earlier technology. The pore diameter was also increased to 1.2 µm, which was greater than 0.7 µm in the earlier technology. The synergy of these effects led to the further improvement in the cell electrical efficiency.

The entire disclosure of Japanese Patent Application No. 10-210581 filed on Jul. 27, 1998 including the specification, claims, drawings and summary is incorporated herein by reference in its entirety.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the following claims.

What is claimed is:

1. A base tube for a fuel cell, wherein the base tube is separately surrounded in a film state by a fuel electrode and an oxygen electrode and wherein the raw material for the base tube is calcia-stabilized zirconia, CRZ, having a particle diameter of 1 µm, and the mixture consists of the raw material for the base tube, and coarse particles of a metal oxide selected from the group consisting of NiO, CoO and FeO, said coarse particles of the metal oxide having a particle diameter of 5 µm or more, whereby the mixture shrinks non-uniformly when sintered to increase the porosity of the base tube.

2. The base tube of claim 1 wherein the mixture contains 10 to 40% by weight of the coarse particles of the metal oxide.

* * * * *